Dec. 10, 1946.  H. C. MORGAN  2,412,350
MULTIPLE SCALE, MULTIPLE FUNCTION INSTRUMENT INDICATING SYSTEM
Filed May 10, 1943  5 Sheets-Sheet 1
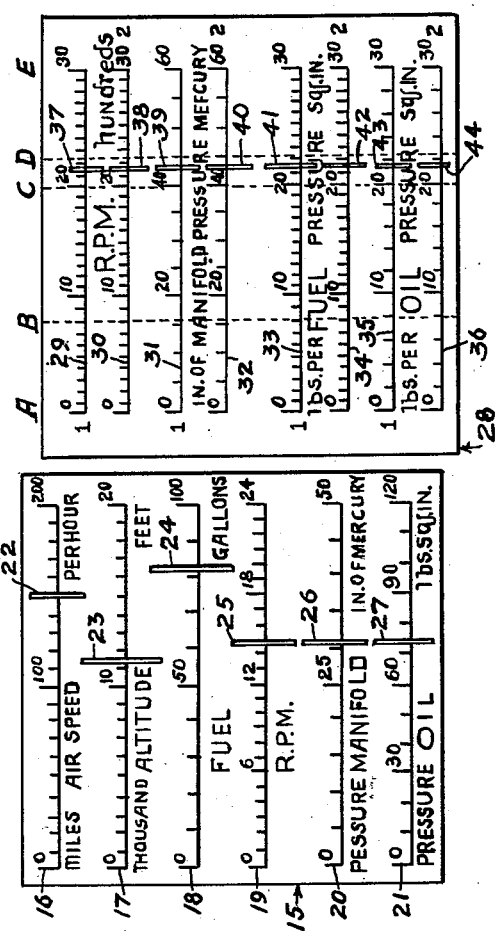
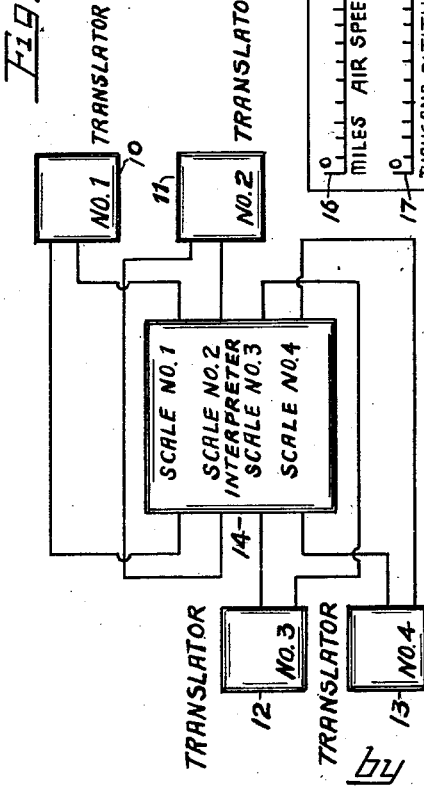
Inventor
Harry C. Morgan.
by Charles W. Hills Atty

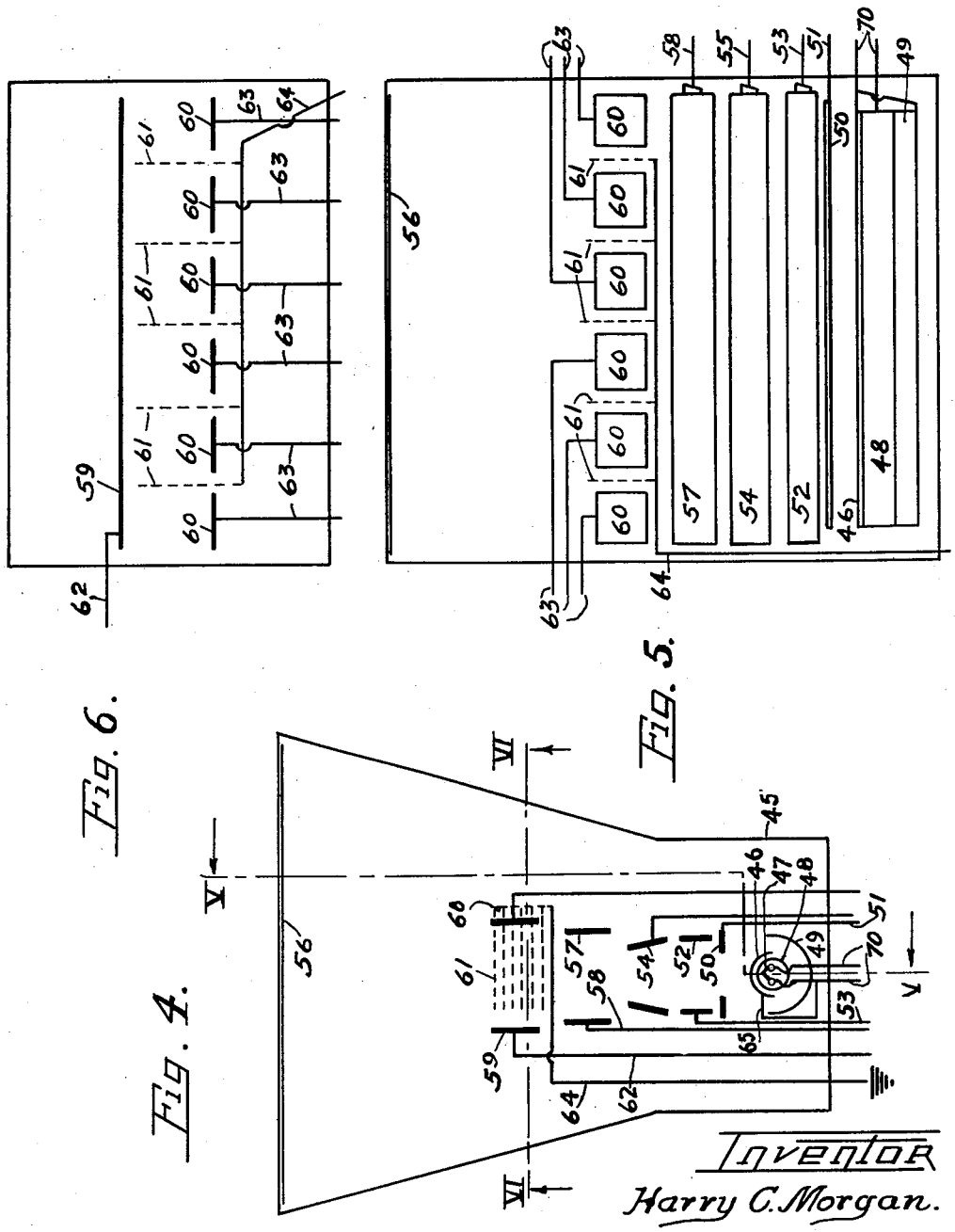

Dec. 10, 1946.    H. C. MORGAN    2,412,350
MULTIPLE SCALE, MULTIPLE FUNCTION INSTRUMENT INDICATING SYSTEM
Filed May 10, 1943    5 Sheets-Sheet 3

Inventor
Harry C. Morgan.
By Charles W. Hills Atty

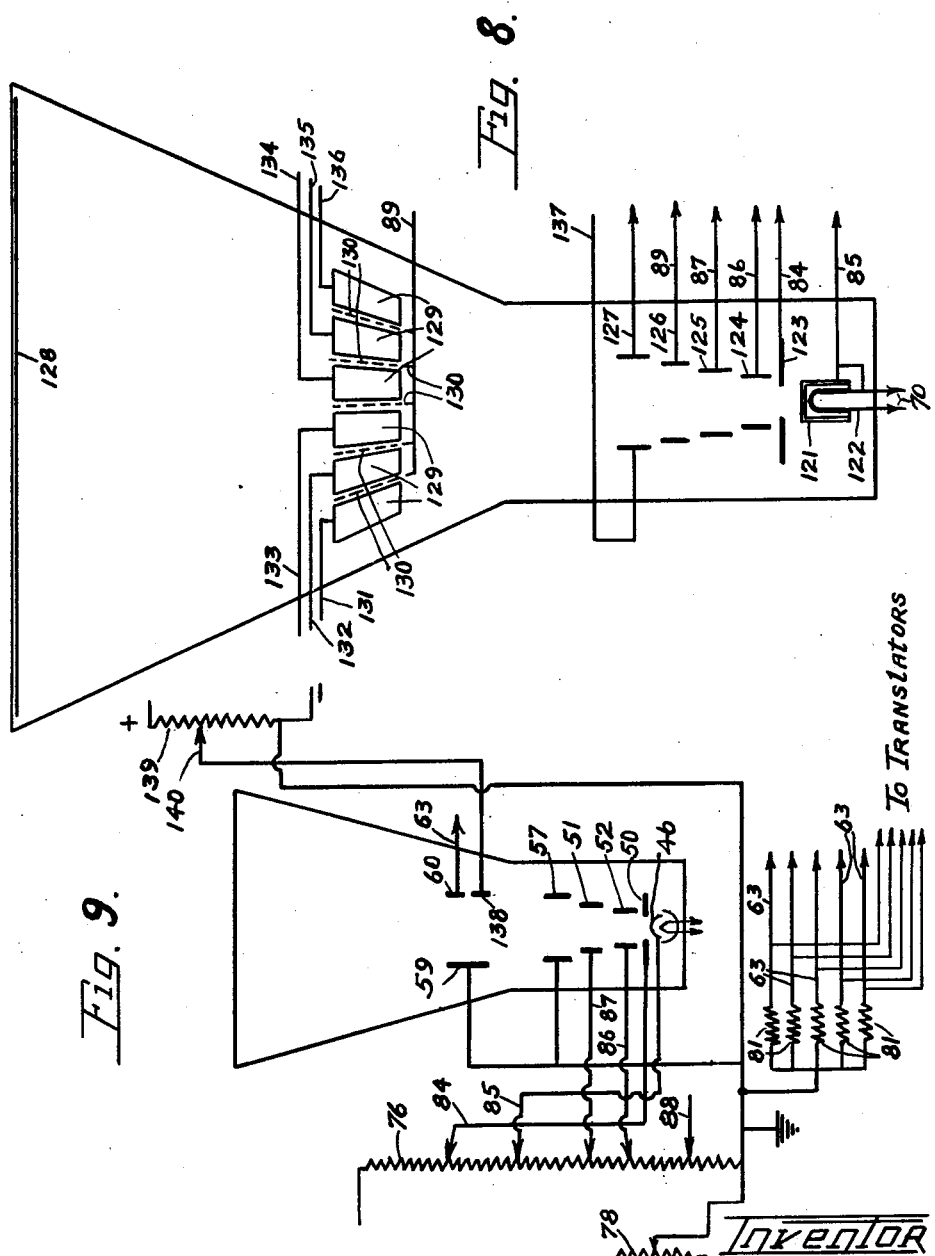

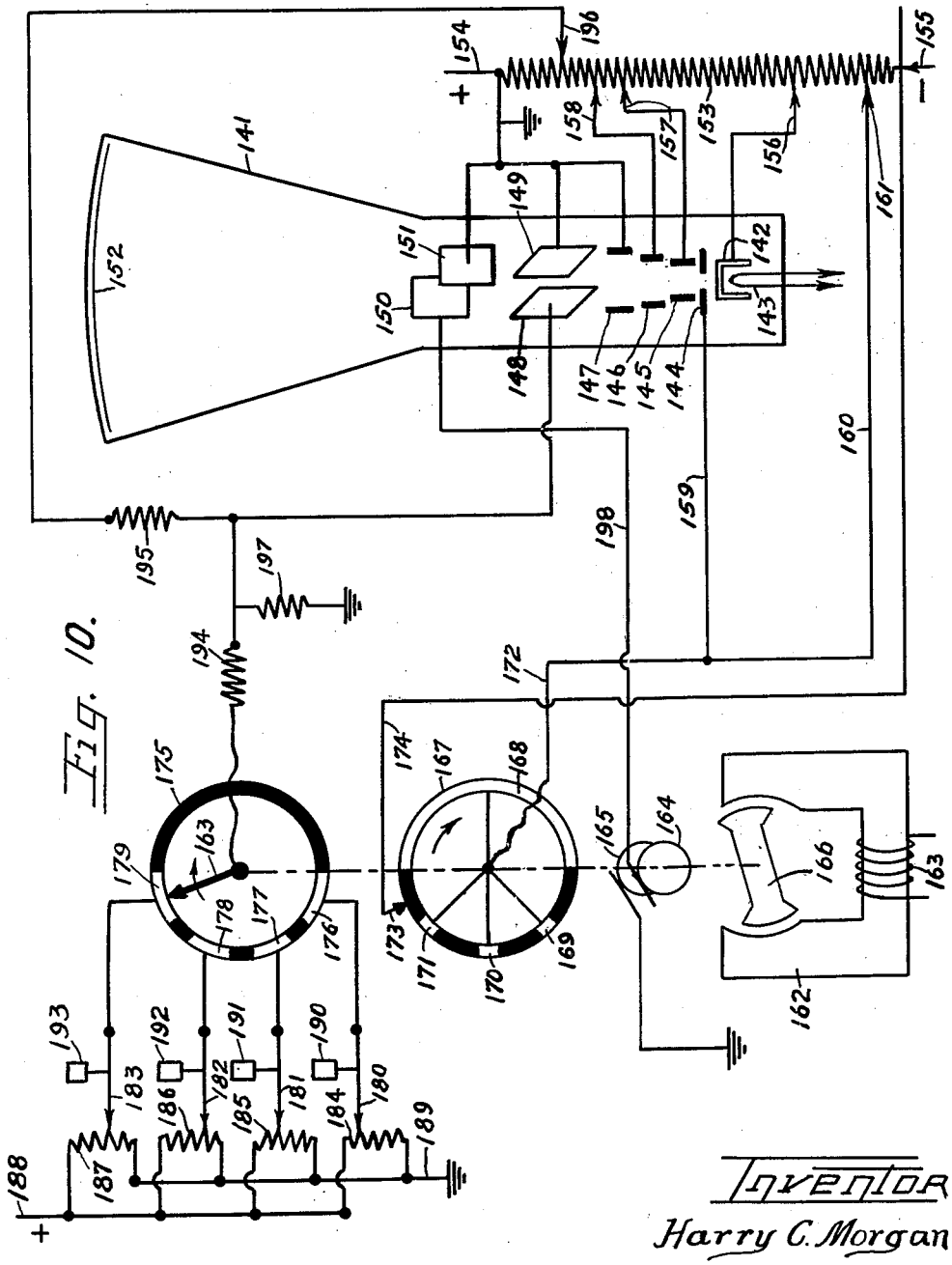

Patented Dec. 10, 1946

2,412,350

UNITED STATES PATENT OFFICE 2,412,350

MULTIPLE SCALE, MULTIPLE FUNCTION INSTRUMENT INDICATING SYSTEM

Harry C. Morgan, Dayton, Ohio, assignor, by mesne assignments, to Curtis Engineering Company, Inglewood, Calif., a copartnership consisting of William H. Curtis and Russell R. Curtis Application May 10, 1943, Serial No. 486,410

3 Claims. (Cl. 177—351)

This invention relates to a multiple scale, multiple function instrument indicating system.

In the operation of aircraft, sea-going craft of various kinds, and other kinds of mobile and stationary equipment where a multiplicity of instruments are used to register the operation of the equipment, it has been the practice in the past to mount the many instruments on a panel in front of the operator. This requires the operator to visually scan the panel at frequent intervals, reading various gauges, instruments, etc. With the advent of multi-motored equipment, as well as with the increase in the number of additional accessories, the number of instruments mounted on the panel has materially increased. As a result, the operator's responsibility has increased proportionately.

The present invention relates to means for simplifying the operator's task of observing performance, and to reducing the panel space required for registration of various necessary readings.

The present invention relates to apparatus which includes a plurality of translators which vary an electrical output, or signal, in accordance with the variation of the quantity being measured, such as speed, pressure, temperature or other functional operations being quantitatively measured, and an interpreter for interpreting and registering the electrical response of each individual translator in a confined locality where it can be observed by the operator.

More particularly it is an object of the present invention to provide a single indicating instrument having a multiplicity of scales thereon which provide a multiplicity of indications corresponding with a like number of conditions being registered.

It is a further object of the present invention to provide a novel instrument indicating means which includes a cathode ray tube having a single beam of electrons, but which gives a plurality of readings simultaneously to the operator, indicating a plurality of conditions being observed.

A still further object of the present invention is to provide an indicating system which includes a cathode ray tube in which the path of the beam of electrons is rapidly altered in response to a series of different electrical values and in which the beam of electrons is caused to impinge on a plurality of different scales in rapid and recurrent succession to indicate a plurality of conditions.

Another object of the present invention is to provide a novel form of cathode ray tube.

Another and further object of the present invention is to provide a novel method of controlling the operation of a cathode ray tube.

Another further object of the present invention is to provide a novel method and means for commutating the biasing potential on the deflecting plate of a cathode ray tube.

Still another and further object of the present invention is to provide a cathode ray tube having means for propagating a sheet of electrons and having a plurality of deflecting plates for isolating and changing the path of movement of selected individual portions of the sheet of electrons.

Still another and further object of the present invention is to provide a novel instrument face and scale arrangement.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawings, in which:

Figure 1 is a diagrammatic illustration of a multiple scale, multiple function instrument indicating system having a single interpreter and four translators;

Figure 2 is an illustration of an instrument face embodying the novel features of the present invention and particularly arranged for a single engine plane;

Figure 3 is an illustration of an instrument face showing a scale arrangement for a multi-motored plane;

Figure 4 is a diagrammatic view of a novel cathode ray tube;

Figure 5 is a diagrammatic view of the elements of the cathode ray tube shown in Figure 4 as taken along the line V—V;

Figure 6 is a diagrammatic view of certain of the elements of the cathode ray tube shown in Figure 4 taken along the line VI—VI;

Figure 7:
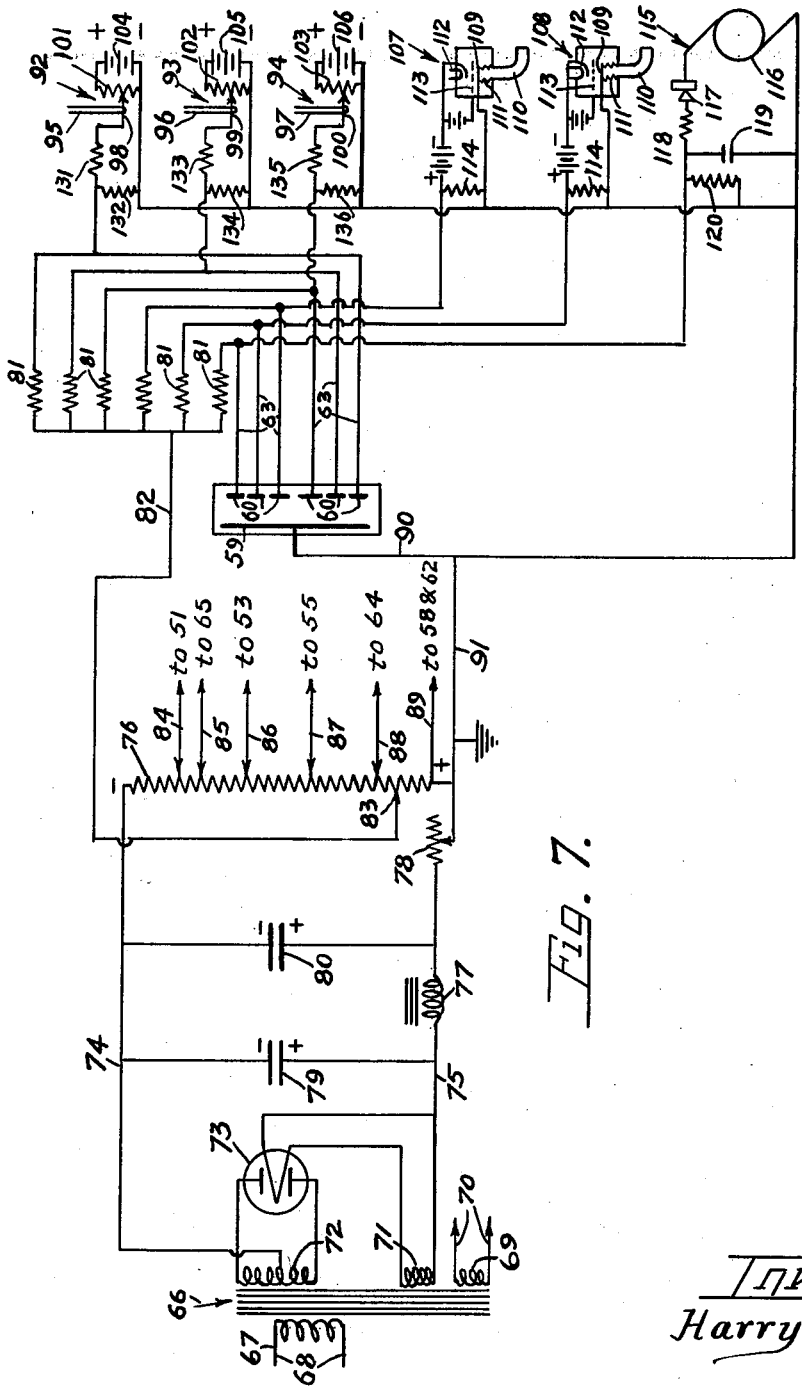
Figure 7 is a wiring diagram illustrating the electrical circuit and operation of the cathode ray tube of Figure 4 as employed in a multiple scale, multiple function instrument indicating system, and embodying the novel features of the present invention.

Figure 8 diagrammatically illustrates a different embodiment of a novel cathode ray tube;

Figure 9 is a modification of the wiring diagram shown in Figure 7 and includes means for adjusting the scale lines to zero; and Figure 10 is a diagrammatic wiring diagram and illustration of a third modification of the present invention wherein a conventional cathode ray tube is employed in combination with a mechanical commutator system for carrying out the desired functions of the present invention.

In Figure 1 of the drawings there is diagrammatically illustrated the principal component parts of one embodiment of my multiple scale, multiple function instrument indicating system. More particularly, a plurality of translators 10, 11, 12 and 13 are shown as being electrically connected to a single interpreter 14. Each translator is connected to a different scale on the interpreter and acts by virtue of an output signal to cause change in the scale reading of its associated scale as changes occur in the variable conditions being measured. While any suitable term may be employed, I have employed the term "translator" as indicating generally any type of device or means which is responsive to a variable condition being measured and for translating the same into an electromotive force which is proportional to the magnitude of the condition being measured. The electromotive force is then impressed on the interpreter, and the interpreter in turn causes an appropriate indication on the particular scale which is associated with that particular translator.

The particular nature of the interpreter and the manner in which the electromotive forces from the various translators are impressed thereon is the essence of the present invention, and three specific embodiments thereof will hereinafter be described.

The interpreter in each embodiment of the present invention employs a cathode ray tube having a fluorescent screen at the end thereof over which is impressed a plurality of scales calibrated in terms of the respective conditions being measured.

In Figure 2 of the drawings a scale arrangement has been illustrated for use in conjunction with single engine planes. The scale arrangement is on the end of a cathode ray tube where the electron beam excites the fluorescent screen to form indicating lines. As shown in Figure 2, the fluorescent screen 15 is provided with a plurality of scales 16, 17, 18, 19, 20 and 21 which respectively indicate air speed, altitude, fuel content, R. P. M., manifold pressure, and oil pressure. The quantitative indication for each of the scales 16 to 21 is provided by a plurality of short vertical lines 22 to 27 respectively which are formed by impingement of electrons on the fluorescent screen 15. The relative position along the scale of each of the vertical lines 22 to 27 is controlled within the cathode ray tube in a manner presently to be described.

Figure 3 of the drawings illustrates a modified form of scale arrangement wherein a fluorescent screen 28 is provided with a plurality of scales 29 to 36. This particular scale arrangement is especially designed for two-motored planes. Scale 29 indicates the speed of rotation of engine No. 1, while scale 30 indicates the speed of rotation of engine No. 2. Scale 31 indicates the manifold pressure of engine No. 1, while scale 32 indicates the manifold pressure of engine No. 2. Scale 33 indicates the fuel pressure of engine No. 1, while scale 34 indicates the fuel pressure of engine No. 2. Similarly, scale 35 indicates the oil pressure of engine No. 1, and scale 36 indicates the oil pressure of engine No. 2. As was the case in connection with the arrangement shown in Figure 2, a plurality of short vertical lines 37 to 44 formed by the impingement of electrons on a fluorescent screen 28 gives a quantitative indication of the condition being measured. Each of the respective control circuits for determining the position of the vertical lines 37 to 44 can be adjusted so that under normal operating conditions all of the vertical lines will be aligned one above the other. Likewise, strips of fluorescent material which fluoresce different colors can be added to the screen 28, such, for example, as providing the portion of the scale from A to B with material which will fluoresce red, the portion between B and C with material which will fluoresce white, the portion between C and D with material which will fluoresce green, and the portion between D and E with material which will fluoresce white. If all of the indicating lines 37 to 44 are in the green area, the pilot can tell at a single glance that all of the operating conditions are normal. If, on the other hand, he should note that one of the indicating lines 37 to 44 is in a different color area, his entire attention will be directed to, and only to, the line or lines which are out of the normal operating region.

In Figures 4, 5 and 6 of the drawings I have illustrated diagrammatically one form of cathode ray tube or interpreter 45 embodying the novel features and principles of my invention. This cathode ray tube 45 is provided with an outside coated semi-cylindrical cathode 46 which constitutes a source of electrons. The cathode 46 is heated by the heating filament 47 surrounded by a ceramic insulator 48. Heat reflector 49 is disposed on the opposite side of the ceramic insulator 48 from the cathode 46. This heat reflector 49 tends to lessen heat loss of the cathode structure.

Disposed immediately above the cathode 46 is a control grid 50 to regulate the number of electrons in the sheet drawn from the cathode 46. The control grid 50 is provided with a suitable negative potential through conductor 51. An accelerating anode 52 is disposed directly above the control grid 50 and is provided with a sufficiently high positive potential through conductor 53 to cause a sheet of electrons to be drawn from the cathode 46.

Disposed above the accelerating anode 52 is a focusing electrode 54 which is provided with a positive bias through conductor 55. This control electrode 54 is arranged in such a manner that the line formed, when the electron beam strikes the fluorescent screen 56 disposed in the upper end of the tube 45, will be focused to the desired width. A second accelerating anode 57 is disposed above the control electrode 54 and receives its biasing potential through conductor 58. This second accelerating anode 57 gives the electrons in the sheet (or beam) their final velocity.

Disposed above the second accelerating anode 57 is a deflector plate 59 and a plurality of deflector plates 60, the latter being disposed opposite the deflector plate 59, (as shown in Figure 6). The deflector plates 60, in conjunction with the deflector plate 59, are arranged to deflect segments of the sheet of electrons in response to changes in the electric biasing potentials applied to them. As is indicated in Figures 4, 5 and 6, the deflector plates 60 have Faraday electrostatic screens 61 isolating one plate from the electrostatic fields of the other plates. Biasing potentials are received on plate 59 through a conductor 62, and on plates 60 through conductors 63. The Faraday screen 61 is grounded through conductor 64. The cathode 46 is connected by conductor 65 to one of the filament conductors 70.

From the description of the above cathode ray tube, it will be apparent to those skilled in the art that any one of the deflecting plates 60 can cause a portion or segment of the sheet of electrons passing between the deflecting plates 60 and the deflector plate 59 to be deflected, thereby causing that segmental portion of the sheet of electrons to strike the fluorescent screen 56 at a different point therealong, as viewed in Figure 4 of the drawings, from the remaining portion or portions of the sheet. It will thus be apparent that while only a single cathode ray tube is employed, and that while only a single electron emitting source is provided; nevertheless, a plurality of indications are obtained simultaneously on the fluorescent screen 56, depending upon the respective biasing potentials impressed on the various deflector plates 60. This enables a multi-scale, multi-function instrument to be provided with a single cathode ray tube having a single electron emitting source.

A diagrammatic representation of the circuit arrangement for energizing the novel cathode ray tube 45 is shown in Figure 7 of the drawings. More particularly, there is shown a full wave rectifier comprising a transformer 66 having a primary winding 67 arranged to be connected to a suitable source of alternating current or to a source of interrupted direct current through conductors 68. The transformer is provided with a filament heating winding 69 which is connected through conductors 70 to the filament 47 of the cathode ray tube 45. Secondary windings 71 and 72 in conjunction with a rectifier tube 73 provides a conventional full wave rectifier for supplying high voltage direct current to the cathode ray tube 45. The output circuit of the full wave rectifier includes conductors 74 and 75. Conductor 74 is connected to one end of a voltage divider potentiometer 76. Conductor 75 is connected through a filter choke 77 and a rheostat 78 to the other end of the potentiometer 76. A pair of filter condensers 79 and 80 are also provided in the output circuit. The potentiometer 76 is so designed that with all measured apparatus shut off, all indicator lines on the fluorescent screen 56 of the cathode ray tube 45 can be adjusted to the zero point at one end of the scale. The deflector plates 60 are each connected by their associated conductors 63 through isolating resistors 81 (there being one isolating resistor 81 for each deflector plate 60) and conductor 82 to the voltage divider contact 83 on the potentiometer 76. The isolating resistors are of relatively high ohmic value, such, for example, as one million ohms each. These isolating resistors are arranged to prevent changing potentials in one deflector plate 60 from influencing the remaining adjacent deflector plates 60. Adjustable contact points 84, 85, 86, 87 and 88 on potentiometer 76 are arranged to be connected respectively to conductors 51, 65, 53, 55 and 64 of cathode ray tube 45. The lower end of the potentiometer 76 is connected through a conductor 89 to conductors 58 and 62 of the cathode ray tube 45. Deflector plate 59 is grounded through conductors 90 and 91.

The right-hand portion of Figure 7 illustrates how various translators may be connected to the cathode ray tube 45. Three of the translators marked with the reference characters 92, 93 and 94 are devices arranged to indicate the quantitative value of the conditions being measured by vertical movement of the actuating arms 95, 96 and 97 respectively. These actuating arms 95, 96 and 97 are respectively connected to movable contact arms 98, 99 and 100 of potentiometers 101, 102 and 103. Each potentiometer 101, 102 and 103 is connected respectively to a source of electric energy illustrated as batteries 104, 105 and 106. Load resistors 131 and 132 are connected between contact arm 98 and the negative end of source 104. Load resistors 133 and 134 are similarly connected to arm 99 and the negative end of source 105, and load resistors 135 and 136 are connected to contact arm 100 and the negative end of source 106. The mid-point between each pair of resistors is connected to different conductors 63.

As viewed in Figure 7, the biasing potential on the three lower deflector plates 60 are thus varied in accordance with the position of the contact arms 98, 99 and 100 of the translators 92, 93 and 94. The two translators shown immediately below translators 92, 93 and 94 are identified by the reference characters 107 and 108, and are in the form of electron discharge devices, each having a movable anode 109 therein whose position within the discharge device is varied by changes of pressure in the pressure pipes 110. More specifically, the anodes 109 are mounted on the end of Sylphon bellows 111 which form end portions of and extend within the discharge devices. Variations in the spacing of the anodes 109 with respect to the cathodes 112 and the grids 113 vary the current flowing through the load resistors 114 in each of the output circuits of the discharge devices. The positive side of the load resistors 114 are each connected to one of the deflector plates 60 of the cathode ray tube 45. Whenever the pressure in one of the pressure tubes 110 is changed, the position of the associated anode 109 is changed, which causes a corresponding change in the biasing potential on the associated deflector plate 60.

The lowermost translator illustrated in Figure 7 of the drawings is indicated by the reference character 115 and includes a tachometer generator 116, a rectifier 117, a filter resistor 118 and a filter condenser 119. A load resistor 120 is connected across the output of the tachometer generator 116 and the positive side of the load resistor 120 is connected to one of the deflector plates 60 of the cathode ray tube 45. The amount of current flowing through the load resistor 120 will be proportional to the speed of rotation of the tachometer generator, and it will thus be seen that the potential impressed on the deflector plate 60 associated with this particular translator will be a function of the speed of rotation of the tachometer generator. The tachometer generator may be driven from the airplane engine and it will thus be seen that the speed of rotation of the engine may be registered on a suitable scale on the fluorescent screen 56 by the variation in the segmental portion of the sheet of electrons which is deflected by the particular deflector plate 60 associated with the tachometer generator 116.

In Figure 8 of the drawings, I have illustrated a modified form of a cathode ray tube wherein a cylindrical pencil of electrons is established in the tube, and wherein the pencil of electrons is scanned back and forth between all of the deflector plates at a scanning rate of greater than 16 sweeps per second. More particularly, the tube includes a cathode 121 which is heated by a filament 122. Disposed immediately above the cathode 121 is a control grid 123 and in successive order thereabove are a first accelerating anode 124, a line focusing anode 125, a second accelerating anode 126 and deflecting plates 127 to scan the scale lines on the fluorescent screen 128 with a spot. A series of deflector plates 129 are provided which correspond to the deflector plates 60 in the embodiment of the invention illustrated in Figures 4, 5 and 6 of the drawings. An elongated deflector plate (not shown) similar to deflector plate 59 of Figures 4, 5 and 6, lies in spaced relation directly behind the deflectors 129. A Faraday electrostatic shield 130 is disposed between each of the deflector plates 129 for the same reason as previously described in connection with Figures 4, 5 and 6.

A cylindrical pencil of electrons from the cathode 121 is drawn out by the positive potentials on the accelerating anodes 124 and 126, and the focusing anode 125. The control grid 123 controls the quantity of electrons forming the beam. The auxiliary deflecting plates 127 are arranged so that when an alternating current is applied to them, the pencil beam of electrons is scanned back and forth between all of the deflecting plates 129 and the single confronting deflector plate (not shown) lying directly therebehind and in spaced relation thereto. If the frequency of scanning is greater than 16 sweeps per second a series of straight lines is drawn on the fluorescent screen 128 in positions determined by the potentials between the deflector plates 129 and the confronting deflector plate (not shown) lying therebehind. It will be understood that the frequency of scanning shall be sufficiently great to provide a retentivity of vision characteristic on the scales of the fluorescent screen.

The control circuit by which the respective elements of the cathode ray tube of Figure 8 are energized is similar to the one shown in Figure 7. More particularly, the filament 122 is arranged to be connected through conductor 70 of Figure 7 as indicated. Similarly, cathode 121 is arranged to be connected to conductor 85; control grid 123 is arranged to be connected to conductor 84; the first accelerating anode 124 is arranged to be connected to conductor 86; the line focussing anode 125 is arranged to be connected to conductor 87; the second accelerating anode 126 is arranged to be connected to conductor 89, and deflecting plates 127 are arranged to be connected to any suitable source of alternating current through conductors 137. Deflecting plates 129 are arranged to be connected to conductors 63 of Figure 7, while the electrostatic shields 130 are arranged to be grounded through conductor 88.

Figure 9 of the drawings illustrates a modified method of adjusting the scale lines to zero. The deflecting plate 59 and the deflector plates 60 are connected in the same manner as shown in Figure 7 through conductor 62 and conductor 63 respectively. An additional plate 138, of the same length as plate 59 and opposed to it, is connected to a potentiometer 139; the potentiometer 139 being connected to a suitable source of potential with the high potential side at the upper end of the potentiometer and the low potential side at the lower end of the potentiometer. By adjusting the adjustable contact 140 of potentiometer 139 a negative voltage with respect to deflector plate 59 is applied to the deflector plate 138 which is sufficient to adjust the scale lines to zero. The remaining portion of the circuit of Figure 9 is similar to that shown in Figure 7, with the exception that the isolating resistors are connected to ground instead of to the voltage divider element 76. Indeed, resistors 81 may be eliminated entirely if desired and the plates 60 connected directly to the respective translators.

The third embodiment of the present invention is illustrated in Figure 10 of the drawings; wherein a conventional cathode ray tube can be adapted by the use of mechanical commutators to the system of translators and interpreter as diagrammatically represented in Figures 1, 2 and 3. More particularly there is shown in Figure 10 a cathode ray tube 141 having a cathode 142 therein heated by a heating filament 143 and including the usual control grid 144, a first accelerating anode 145, a line focusing anode 146, and a second accelerating anode 147. This cathode ray tube also includes a pair of horizontal deflecting plates 148 and 149 and a pair of vertical deflector plates 150 and 151. At the end of the tube 141 is the usual fluorescent screen 152. The cylindrical pencil of electrons passing through the tube have their path controlled by the deflector plates 148 to 151.

Suitable biasing potentials for the various elements of the tube 141 are provided for by a voltage divider element 153 which is connected across a high voltage source through conductors 154 and 155. The cathode 142 is connected to the voltage divider element 153 through movable contact element 156. Similarly, anodes 145 and 146 are connected to a voltage divider element 153 through movable contacts 157 and 158 respectively. The control grid 144 receives a normal negative bias through conductors 159 and 160, the latter of which is connected to a movable contact element 161 engaging the voltage divider element 153. The second accelerating anode 147 is connected to the upper end of the voltage divider element 153 as well as to deflector plate 149 and deflector plate 151.

Means are provided for successively moving the stream of electrons from one scale to another on the fluorescent screen 152 and to simultaneously synchronize the relative horizontal position of the stream of electrons in accordance with each of the successive conditions to be registered. This is accomplished by providing a small alternator 162, the stator energization circuit of which is shown diagrammatically by the stator winding 163' and the output circuit of which is shown diagrammatically by the slip rings 164 and 165. Mounted on the same shaft as the rotor 166 of the alternator 162 is a commutator 167 and a rotating brush 163. The commutator 167 is mounted for rotation with the rotor 166 and includes conducting segments 168, 169, 170, and 171. Each of the segments 168 to 171 are electrically connected together and to a conductor 172 which directly connects each of the conducting segments to the contact arm 161 on the voltage divider element 153. Associated with the commutator 167 is a stationary contact point or brush arm 173 which is directly connected through a conductor 174 to the negative end of the voltage dividing element 153.

Associated with the rotatable brush arm 163 is a stationary commutator element 175 which is provided with conducting segments 176, 177, 178 and 179. The conducting segments 176 to 179 inclusive, of the stationary commutator 175, are of such size and are located in such a position that the brush arm 163 engages the conducting segment 179 at the same time that brush arm 173 engages the insulating segment lying between the conducting segments 171 and 168 of commutator 167.

Each of the conducting segments 176 to 179 of the commutator 175 are connected to the movable contact arms 180 to 183 respectively which in turn engage voltage divider elements 184 to 187 which are energized from a suitable source of electric energy through conductors 188 and 189. Each of the arms 180 to 183 are arranged to be physically moved by the conditioning determining elements which are diagrammatically represented as 190 to 193, inclusive. The movable brush arm 163 is electrically connected through isolating resistors 194 and 195 to the movable contact arm 196 of the voltage dividing element 153. An additional resistor 197 is interposed between resistors 194 and 195 and is connected at its opposite end to ground.

The output of the alternator 162 is connected across vertical deflector plates 150 and 151. More particularly, the slip ring 164 is connected to deflector plate 150 through conductor 198, while slip ring 165 is connected through ground to the deflector plate 151.

From inspection of Figure 10 of the drawings, it will be apparent that as the alternator causes the beam of electrons in the tube 141 to scan the various scales of the fluorescent screen 152, the horizontal deflector plate 148 is successively biased in accordance with the position of the movable contact arms 180 to 183. It will thus be seen that with the brush arm 163 in the position as shown in Figure 10 of the drawings, the biasing potential on the deflector 148 is determined by the position of movable contact arm 183. As the brush arm 163 then passes over the insulating segment lying between conducting segments 179 and 176 (which insulating segment extends around 180° of the commutator 175) the output of the alternator is causing the beam to be returned to the top scale. As the brush arm 163 engages conducting segment 176 the biasing potential on the deflector plate 148 is determined by the position of the arm 180. We may say, for example, that the beam is now scanning the top scale in the fluorescent screen. Similarly, as the brush arm 163 engages conducting segment 177 the biasing potential on deflector plate 148 is determined by the relative position of movable contact arm 181. In the meantime, however, the alternator has changed the bias on the vertical deflector plates 150 and 151, thus causing the beam of electrons to scan the second scale. As the alternator continues to turn, the electron stream is moved down to the third scale and the brush arm 163 now connects movable contact arm 182 to the horizontal deflector plate 148.

The commutator 167 and its stationary brush 173 are so arranged that the trace line of the cathode ray spot between scales is blanked out by a high negative potential applied to the control grid 144. This may readily be seen from an inspection of Figure 10. Whenever one of the conducting segments 168 to 171 is in contact with the brush 173, a high negative potential is impressed on the control grid 144. It will further be seen that the conducting segment of the commutator 167 corresponds to the insulating segment of the commutator 175; hence it will be understood that when the movable brush arm 163 of commutator 175 is moving between conducting segments no electrons will reach the fluorescent screen 152 in the cathode ray tube 141. It will furthermore be observed that during the time when the cathode ray spot is being returned from the lower scale to the top scale the flow of electrons is also blocked due to the conducting segment 168 of commutator 167.

Due to the fact that the commutator 167 and the brush arm 163 are mounted for rotation with the rotor 166 and the alternator 162, it is not necessary that the speed of the alternator remains constant. Furthermore, due to the fact that it is desirable that all of the scales marked out on the fluorescent screen 152 should give, insofar as the human eye is concerned, simultaneous readings, it is necessary that the speed of the alternator be such that all of the scales are scanned sufficiently rapidly to afford retentivity of vision on all scales. I have found in practice that the rotation of the alternator should not be less than 1200 revolutions per minute.

While I have shown particular embodiments of my invention, it will of course be understood that I do not wish to be limited thereto, since many modifications may be made, and I therefore contemplate, by the appended claims, to cover all such modifications as fall within the true spirit and scope of my invention.

I claim as my invention:

1. A multiple scale multiple function instrument indicator system comprising a plurality of condition determining devices, and a single cathode ray tube arranged to project a sheet of electrons on a fluorescent screen contained therein, said cathode ray tube including means for deflecting different segmental portions of said sheet of electrons as a function of each of the respective conditions determined by said condition determining devices.

2. A multiple scale multiple function instrument indicator system comprising a plurality of condition determining devices, each having means for supplying a biasing potential whose value is a function of the condition being determined, and a single cathode ray tube arranged to project a sheet of electrons on a fluorescent screen contained therein, said cathode ray tube including separate means for each of said condition determining devices responsive to variations in its biasing potential, means for deflecting different segmental portions of the projected sheet of electrons.

3. In a multiple scale indicator, the combination comprising a plurality of translators for recording different measured conditions and for setting up a biasing potential which varies as a function of the value of the measured condition, a cathode ray tube interpreter having a fluorescent screen provided with scales corresponding to the various measured conditions, said cathode ray tube including a plurality of deflector plates, a resistance element connected to each of said plates and to a voltage divider element, means connecting the individual biasing potentials established by said translators to different ones of said plurality of said deflector plates, at least one additional plate confronting said plurality of deflector plates in said cathode ray tube, and means for maintaining a different bias on said last plate from said plurality of plates.

HARRY C. MORGAN.